Oct. 3, 1933.  G. C. KUFFEL  1,928,969
WELL SURVEY INSTRUMENT
Filed Oct. 15, 1930
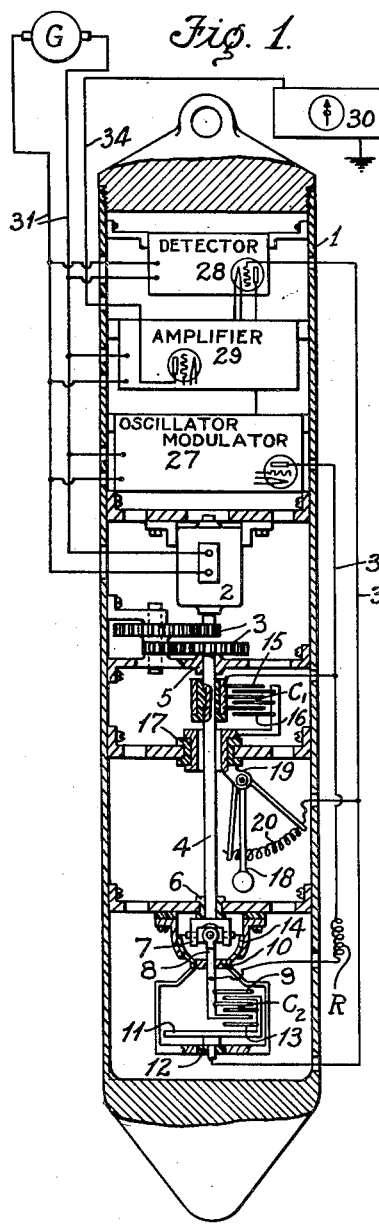
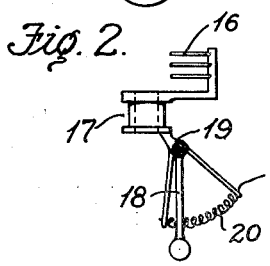
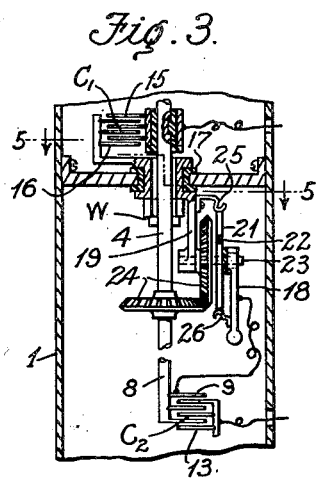
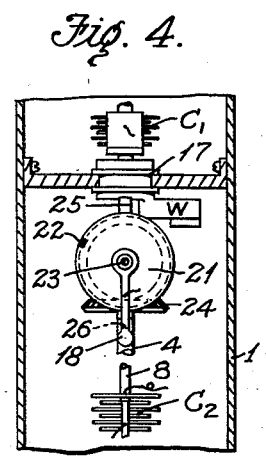
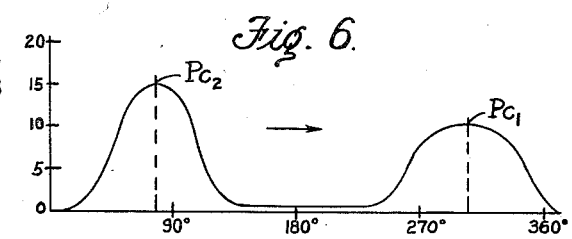
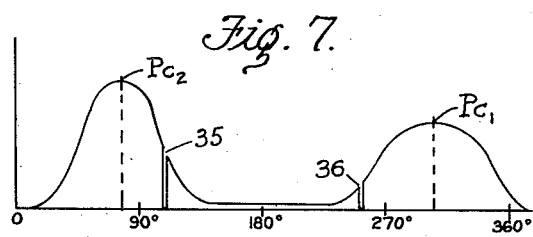
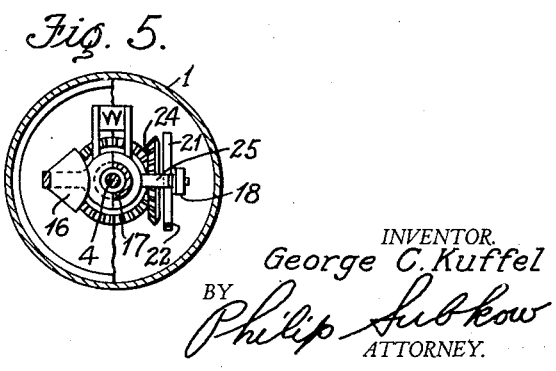
INVENTOR.
George C. Kuffel
BY Philip Subkow
ATTORNEY.

Patented Oct. 3, 1933

1,928,969

UNITED STATES PATENT OFFICE 1,928,969

WELL SURVEY INSTRUMENT

George C. Kuffel, Long Beach, Calif., assignor to Union Oil Company of California, Los Angeles, Calif., a corporation of California Application October 15, 1930. Serial No. 488,843

27 Claims. (Cl. 234—5.3)

This invention relates to devices for surveying bore holes such as deep wells, whereby both the degree of inclination and the direction of inclination of the hole may be determined at successive points in order to indicate the trend of the bore.

The object of the invention is to provide a comparatively simple and economic structure capable of indicating at the surface readings directly indicative of the deviation and direction of deviation for each position as the well is being surveyed and also capable of supplying a modified electric current to any suitable recording apparatus such that suitable record curves may be made.

The structure of the present invention comprises an instrument adapted to be lowered into a bore hole, which instrument contains the primary elements of the apparatus, and surface mechanism including a direct current generator and a recording voltmeter or ammeter. The well instrument comprises a casing in which there is mounted a gravity operated member including a pendulum and resistance adapted to indicate the degree of deviation at any given point, and a compass member, such as a magnetic needle capable of indicating orientation. These two members are placed in an electric circuit and operate to transmit electrical waves or impulses indicative of the angle and the direction of inclination. According to a preferred form of the invention, a motor driven shaft is disposed axially of the casing and is connected to drive at uniform speed a portion of the indicating member for the pendulum and also a portion of the indicating member for the compass. In one form a variable condenser is employed in conjunction with the pendulum and a second variable condenser is employed in conjunction with the compass. Here the spacing of the peaks of the voltage curves as produced by the action of the two condensers is a measure of any angular displacement of the instrument, i. e. orientation. In one form where a resistance is employed with the pendulum, the amplitude of the wave peaks produced by the pendulum is a measure of the degree of inclination, and in another form the spacing of two interruption gaps where one is caused by a fixed member and the other by the pendulum, is a measure of said deviation.

The invention may be broadly stated as comprising a method and apparatus wherein a means is employed to modify an electric current for indicating inclination of the apparatus and other means is employed for further modifying the current to indicate orientation of the apparatus.

The invention also includes such a method and apparatus wherein the spacing of the peaks of the curve is a measure of the orientation, and another modification curve is a measure of inclination of the apparatus at any given position. The measure of such inclination may be either the amplitude of one of the peaks or the spacing of the other modification in the curve such as interruption gaps. The invention includes further an apparatus comprising a mounting adapted to swing by gravity into the plane of maximum inclination, a pendulum carried by said mounting and swinging in said plane, a rotating member operating in conjunction with said pendulum to indicate orientation of the plane of maximum inclination, and a member correspondingly rotated with respect to a direction determining member to indicate the direction of inclination.

In the accompanying drawing wherein certain embodiments of the invention are shown by way of illustration:

Fig. 1 shows a vertical sectional view of the surveying instrument;

Fig. 2 is an elevational detail of the articulated pendulum unit per se;

Figs. 3 and 4 are sectional elevations at right angles to each other of a modified arrangement of the articulated pendulum;

Fig. 5 is a cross-section taken on line 5—5 of Fig. 3; and

Figs. 6 and 7 are curves electrically transmitted to and recorded at the surface when employing the pendulum arrangements shown in Figs. 1 and 3 respectively.

The well instrument, that is the member which is to be lowered into the hole, comprises a watertight case 1, shown in Fig. 1, inside of which is mounted a constant speed electric motor 2, geared at 3 to a shaft 4 held co-axial with the instrument case by bearings 5 and 6. At the lower end of this shaft and coupled to it by means of a universal joint 7 is a shaft extension 8, which carries condenser plates 9 of a condenser $C_2$. Below shaft extension 8 and held co-axial with it by a universal joint 14 and bearing 10 is a magnetic needle 11 pivoted at 12. One end of needle 11 carries condenser plates 13 so positioned that plates 9 can pass through them. By reason of universal joints 7 and 14, this assembly will always hang vertically so that compass needle 11 can remain horizontal and in line with the magnetic meridian through all practical angles of instrument inclination. This condenser serves to indicate compass position with respect to the other parts.

On the upper end of shaft 4 are mounted condenser plates 15 which are adapted to mesh with a set of plates 16 and have a common angular position with the plates 9 on the lower end of extension 8. The plates 16 form part of an assembly which is rotatably mounted on a bearing 17 concentric with shaft 4, said plates 16 forming the relatively stationary member of a condenser $C_1$. On its under side said bearing 17 carries a supporting arm 19 for a pendulum 18 swung eccentrically with respect to bearing 5. The center of gravity of this assembly is thus made eccentric to its support, so that gravity will maintain the plane of pendulum swing parallel to the plane of maximum slope. Pendulum 18, which always remains vertical, carries a contact point which moves over a resistance 20 as the inclination of the instrument varies. The pendulum 18 and plates 16 are disposed in the same plane, and thus the condenser 15, 16 becomes an orienting member for the pendulum, or, in other words, for the plane of maximum inclination.

In Figs. 3 and 4 a modified pendulum structure is shown where the resistance 20 is replaced by a metal disc 21 having an insulating segment 22 on its periphery. This disc is mounted on a shaft 23 carried by arm 19 and is geared to shaft 4 by bevel gears 24 so that the disc makes one revolution for each shaft revolution. Electrical contacts 25 and 26 are carried respectively by the arm 19 and the pendulum 18 in contact with the edge of the metal disc 21. Weight W causes this pendulum assembly to rotate to bring the plane of pendulum swing into the plane of greatest inclination.

The upper portion of the instrument, as indicated in Fig. 1, contains a generator of modulated high frequency alternating current 27, a detector 28 and an amplifier 29. In both of the forms shown in Figs. 1, 3 and 4, the pendulum circuit $C_1$, 18 is connected in series with the compass circuit $C_2$ and with parts 27, 28, 29 as indicated in Fig. 1. Fig. 1 also represents the surface mechanism which comprises a source G of direct current, a recording voltmeter 30 and connecting circuits 31.

*Operation*

Referring to Fig. 1, when the instrument has been lowered into a bore hole a desired distance which is determined by the length of cable paid out, the instrument is there held stationary long enough for the pendulum and compass to come to rest, after which current from G is switched into lines 31 leading to the instrument through the suspending cable. The modulated high frequency current generator 27, detector 28 and amplifier 29 are thus energized. Motor 2 which also is set in operation, then slowly rotates shafts 4 and 8 through gearing 3 in a known direction at a constant rate, for example 2 R. P. M. clockwise, with respect to the top of the instrument. Condenser plates 9 and 15 of condensers $C_2$ and $C_1$ carried on shafts 8 and 4 respectively as described above, are keyed thereto at a common angular position. As these plates rotate, they alternately enter and leave plates 13 and 16, thereby varying the capacities of said condensers from a minimum to a maximum for each shaft revolution.

Since plates 13 always remain in the vertical plane through the compass needle 11, and plates 16 always remain in the plane of the instrument's greatest deviation from the vertical, the angular separation of the peaks of greatest capacity of these condensers will be, therefore, equal to the angular difference of the bearing of the compass and the bearing of the slope of the bore hole. At the same time, the pendulum 18 takes a position on the resistance segment 19 corresponding to the vertical slope of the instrument, the amount of resistance thus connected into the circuit being a measure of said slope.

The indications of the above described conditions are transmitted to the surface instruments, electrically, in the following manner: The oscillator modulator 27, is a source of modulated high frequency alternating current, which may be of the vacuum tube type diagrammed here. This current passes through conductor 32 to two parallel circuits, one through condenser $C_1$, pendulum 18 and resistance segment 20, and the other through inductance R and condenser $C_2$ and thence from both circuits through 33 to the detector or rectifier 28.

Since a condenser is a conductor to alternating current and acts like a resistance whose value for a given frequency is inversely proportional to the capacity, a peak of voltage will be impressed on the detector for each peak capacity of condensers $C_1$ and $C_2$ during each revolution of shafts 4 and 8. The modulated high frequency alternating current thus transmitted and impressed on the detector 28 is there rectified to a pulsating current at modulator frequency, amplified at 29 and conducted as pulsating direct current through conductor 34 to recording voltmeter 30 at the surface. The condenser capacity wave peaks appear as voltage peaks on the chart, the separating distances of which are proportional to the angular displacements between condenser plates 13 and 16, and thus a measure of the bearing of the slope of the bore hole. Inductance R is placed in series with $C_2$ for the purpose of regulating the relative amplitudes of the two recorded voltage peaks in order to identify the one corresponding to $C_1$ from the one corresponding to $C_2$. For example, it is intended here to adjust the circuits so that the amplitude of peak $P_{C_2}$ (Figs. 6 and 7), corresponding to $C_2$, will always be greater than the greatest amplitude of $P_{C_1}$ corresponding to $C_1$. The amplitude of the voltage peak corresponding to the peak capacity of $C_1$ will be modified by the amount of resistance cut out on resistance segment 20 by pendulum 18 and therefore a measure of the inclination of the instrument.

In the modified form of articulated pendulum shown in Figs. 3 and 4, described above, disc 21 will make one revolution per revolution of shaft 4. For each revolution of said disc there will be two momentary breaks in the circuit from the oscillator to the detector 32; one when the insulating segment 22 passes under contact 25 and one when it passes under contact 26. These breaks will appear in the curve on the recording voltmeter chart as shown at 35 and 36, Fig. 7. When the instrument is vertical, the pendulum 18 will hang parallel to the instrument axis as shown in Fig. 4. Here the contact breaks will appear at regular intervals of 180°. As the instrument deviates from the vertical, pendulum 18 will move to the right (Fig. 4), carrying contact 26 around the periphery of disc 21 in a counter-clockwise direction to a new position with respect to contact 25. The breaks will then occur at two unequal intervals, which will be proportional to the clockwise and anti-clockwise angular separation of the contact points. One hundred and eighty degrees (180°) minus either one of the two angular intervals will be equal to the angular deviation of the instrument from the vertical.

Curves similar to those shown in Figs. 6 and 7 will be thus inscribed electrically on the recording voltmeter chart, which can be graduated to read the perpendicular angular deviation and bearing directly.

As an example Fig. 6 represents a record of the voltmeter at the surface for one cycle of operation or one revolution of shaft 4, 8 of the instrument of Fig. 1. The arrow on the chart indicates the direction of pen motion with respect to the chart. $Pc_2$ is first recognized by its amplitude as corresponding to condenser $C_2$ and therefore the position of the north magnetic meridian. $Pc_1$ is recognized as corresponding to $C_1$ and the plane of the greatest slope of the bore hole. Since the rotation of shaft 8 is clockwise, the said plane of slope will be, therefore, in a clockwise direction with respect to magnetic north equal to the angular separation of $Pc_2$ and $Pc_1$, on the chart, or approximately 230°. Thus the instrument is oriented. As previously stated, pendulum 18 will move across and vary resistance 19 as the instrument deviates from the perpendicular, thereby varying the resistance of circuit containing $C_1$. This variation in resistance will appear on the chart as a variation of amplitude of the curve $Pc_1$. By calibration or computation, a scale may be derived as shown at the left border of Fig. 6 by which the deviation from the perpendicular can be read. As shown this deviation is 11°. When using an articulated pendulum arrangement such as shown in Figs. 3 and 4, a curve will be recorded on the chart as shown in Fig. 7. While the instrument is vertical, pendulum 18 will remain parallel to the instrument axis and contact points 25 and 26 diametrically opposite each other. In this position, contact will be broken by insulating segment 22, each 180° of rotation of the disc and likewise each 180° rotation of shaft 8. As the instrument deviates from the perpendicular, pendulum 18 will move around the disc a distance equal to said angular deviation. The breaks or interruption gaps will now occur at intervals which are alternately greater and less than 180° by the amount of the angular deviation. Thus the breaks or interruptions as shown in Fig. 7 are read as 120° and 255° and the angle between them is 135°. The difference between 180° (i. e. half the circle) and this angle of 135°, is the deviation of the instrument. Therefore in this example the inclination of the instrument from the vertical is 45°.

It is to be understood that the disclosures here made are by no means limitations on the invention but are to be considered merely as illustrative, since various other modifications may be made within the scope of the claims by those skilled in the art.

I claim:

1. A method for surveying bore holes comprising passing an electric current through an instrument lowered into such a hole, modifying said current in accordance with inclination, and further modifying said current to indicate direction of deviation.

2. A method for surveying deep wells comprising introducing into a well an instrument containing electrical devices sensitive to inclination from the vertical and to horizontal displacement, passing a current through said devices, modifying the amplitude of the current to indicate maximum deviation from the vertical at any given position, and further modifying the current to indicate orientation of such maximum deviation.

3. A method for surveying deep wells comprising introducing into a well an instrument containing an electrical detector sensitive to inclinations from the vertical, passing a current through said detector, swinging the detector into the plane of maximum inclination to cause modification of the current in accordance with the degree of deviation, further modifying the current for orientation of such plane of maximum inclination, and indicating the compass direction with respect to said plane.

4. A method according to claim 3 wherein the amplitude of the current is made to represent the inclination.

5. A method according to claim 3 wherein a further change in amplitude constitutes said further modification.

6. A method according to claim 3 wherein one modification of the current is a complete interruption in the current.

7. An apparatus for surveying deep holes comprising an instrument adapted to be lowered into the hole, means to indicate maximum inclination from the vertical, a compass, means to indicate the compass position, and means to indicate the relation of the compass position to the plane of maximum inclination.

8. A mechanism for surveying deep wells comprising an instrument adapted to be lowered into a well, devices in said instrument electrically sensitive to deviation from the vertical and to horizontal displacement of the instrument, a circuit in which said devices are located, certain of said devices being adapted to modify a current in accordance with maximum deviation of said instrument from the vertical, and certain of said devices being adapted to further modify said current to orient the plane of maximum inclination.

9. A structure according to claim 8 in combination with a compass and means to indicate the compass direction with respect to said plane.

10. A survey instrument for a bore hole, comprising a pendulum unit having a pendulum adapted to swing into the plane of maximum inclination, an orienting member for the pendulum, a compass, and means for indicating compass position with respect to said plane.

11. A survey instrument according to claim 10 wherein the pendulum unit is connected electrically with the orienting member.

12. A well survey instrument for a bore hole comprising a pendulum unit having a pendulum adapted to swing into the plane of maximum inclination, a rotating orienting member to indicate the plane of maximum inclination, a compass, and rotating means to indicate the relation of compass position to said plane.

13. A structure according to claim 12 including an electric circuit in which the pendulum is connected to vary the amplitude of the current, the orienting member also being connected in said circuit to vary the current for indication of the plane of inclination.

14. A well survey instrument adapted to be lowered into a bore hole comprising a rotary shaft, a pendulum unit having a pendulum movable into planes of maximum inclination, a member rotated by said shaft to indicate the plane of inclination, and a compass for relative indication of direction.

15. An instrument according to claim 14 including an electric circuit in which the pendulum and the rotating member are connected for respective modification of a current through the circuit, and a second member on and rotated by said shaft and cooperating with said compass to indicate the relation of compass direction to pendulum positions.

16. A well survey instrument comprising a rotating shaft, an orienting member constantly rotated thereby, a pendulum cooperating with said member and movable into planes of maximum inclination, a compass, and a second member also rotated by said shaft to indicate relative compass bearing, an electric circuit in which said members are connected, and an interrupter cooperating with one of said members to produce indicative breaks in a current flowing in said circuit.

17. A well survey instrument comprising a rotating shaft, a pendulum cooperating therewith and movable into planes of maximum inclination, a variable condenser carried in part by said rotating shaft and in part by the pendulum mounting, a compass, and a second variable condenser carried in part by said rotating shaft and in part by said compass.

18. A well survey instrument comprising a gravity operated member to move in accordance with deviation from the vertical, an electric circuit in which said member is connected whereby said member varies a current through the circuit, and an orientated member also in said circuit to modify the current as an indication of direction of the deviation.

19. A well survey device comprising means for generating an electric wave through various cycles of operation of the device, means to modify such wave in each cycle at the point corresponding to maximum inclination of the well hole, and orienting means cooperating therewith.

20. Apparatus for surveying deep wells comprising means for generating electric current, means for modifying said current in response to directional positions for the purpose of orientation, and means for indicating such modifications at the surface of the well.

21. Apparatus for surveying deep wells comprising means for generating an electric wave, means for modifying said wave in accordance with directional positions for purposes of orientation, means for further modifying said wave in response to inclinational conditions and means for indicating said modifications at the surface of a well.

22. A well survey instrument comprising a rotating shaft, a pendulum cooperating therewith and movable into the plane of maximum inclination, orienting means including a member rotated by said shaft for orientation of said plane, an electric circuit in which the pendulum and orienting member are connected for corresponding modification of current flowing therethrough, and a compass indicative of relative direction.

23. A well survey instrument adapted to be lowered into a well comprising a rotating shaft, a gravity operated member movable into the plane of maximum inclination, a rotating member driven by said shaft for orientation of pendulum position, a circuit in which said members are connected, and an interruption element cooperating with one of said members to produce indicative breaks in current flowing in the circuit.

24. A method for surveying bore holes comprising introducing into such a hole an electric survey device, passing an electric current to said device, and modifying the voltage in accordance with inclination and orientation of inclination respectively of the device.

25. A method for surveying bore holes comprising lowering an instrument containing electrical devices sensitive to variations from the vertical, generating an electric wave in said devices, modifying the wave in accordance with the inclination of the devices, and further modifying the wave to indicate orientation of inclination of the devices.

26. An apparatus for surveying bore holes comprising an instrument adapted to be lowered into a bore hole, said instrument comprising a plurality of electrical devices sensitive to changes in position of the instrument, and means for passing an electric wave through each of said devices, said devices being adapted to deform said wave successively in its passage to indicate inclination and orientation of inclination of said instrument.

27. A well survey device comprising an instrument adapted to be lowered into a well, a gravity operated condenser sensitive to deviations from the vertical, and cooperating means including another condenser sensitive to deviations from a given directional position for determination of the direction of inclination.

GEORGE C. KUFFEL.